United States Patent [19]

Stayer, Jr. et al.

[11] Patent Number: 5,066,729
[45] Date of Patent: Nov. 19, 1991

[54] DIENE POLYMERS AND COPOLYMERS TERMINATED BY REACTION WITH N-ALKYL AND N-ARYL IMINES

[75] Inventors: Mark L. Stayer, Jr., Suffield; Thomas A. Antkowiak, Wadsworth; David F. Lawson, Uniontown; Russell W. Koch, Hartville, all of Ohio

[73] Assignee: Bridgestone/Firestone, Inc., Akron, Ohio

[21] Appl. No.: 506,306

[22] Filed: Apr. 9, 1990

[51] Int. Cl.$^5$ ............................................. C08F 8/32
[52] U.S. Cl. .................................... 525/315; 525/316; 525/332.8; 525/332.9; 525/333.1; 525/333.2; 525/375; 525/376; 525/377
[58] Field of Search ...................... 525/332.9, 375, 376, 525/377, 315, 316, 332.8, 333.1, 333.2

[56] References Cited

U.S. PATENT DOCUMENTS

| | | | |
|---|---|---|---|
| 3,178,398 | 4/1965 | Strobel et al. | 525/359.3 |
| 4,677,153 | 6/1987 | Kitahara et al. | 525/332.9 |
| 4,735,994 | 4/1988 | Roggero et al. | 525/279 |
| 4,816,520 | 3/1989 | Bronstert | 525/375 |

Primary Examiner—Bernard Lipman
Attorney, Agent, or Firm—Frank J. Troy, Sr.

[57] ABSTRACT

A process is provided for preparing a terminally functionalized polymer from a living polymer obtained by anionic polymerization of a diene monomer or mixture of a diene monomer and a vinyl aromatic hydrocarbon monomer which comprises reacting the living polymer with a compound having the formula:

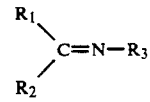

wherein $R_1$ and $R_2$ are selected from the group consisting of H, alkyl, cycloalkyl, aryl, dialkylaminoaryl, aralkyl, and aprotic O, N and S- containing alkyl, cycloalkyl, aryl and aralkyl groups; wherein $R_3$ is selected from the group consisting of alkyl, cycloalkyl, aryl, dialkylaminoaryl, aralkyl, and aprotic O, N and S- containing alkyl, cycloalkyl, aryl and aralkyl groups; with the proviso that at least one of the $R_1$, $R_2$ and $R_3$ groups must be a dialkylaminoaryl group and that not all of the $R_1$, $R_2$ and $R_3$ groups can be aryl groups.

The resultant terminally functionalized polymer has reduced hysteresis properties and may be utilized to prepare elastomer compositions and tire treads having reduced rolling resistance.

28 Claims, No Drawings

DIENE POLYMERS AND COPOLYMERS TERMINATED BY REACTION WITH N-ALKYL AND N-ARYL IMINES

BACKGROUND OF THE INVENTION

The invention relates to a process for preparing terminally functionalized diene polymers and copolymers having reduced hysteresis. More particularly, the invention relates to a process for preparing terminally functionalized diene polymers and copolymers which comprises reacting a living diene polymer or copolymer obtained by anionic polymerization with certain substituted imines, to the terminally functionalized diene polymers or copolymers produced by the process, to elastomer compositions containing such diene polymers or copolymers and to tire treads formed from such elastomer compositions.

In recent years, those active in the tire industry have greatly increased their emphasis on the development of tires having both reduced rolling resistance and good wet traction properties. As is well known, that portion of the tire which exerts the greatest influence on rolling resistance and traction is the tread or tread rubber portion. Low rolling resistance is desirable from a fuel consumption standpoint while good wet traction is desirable from a safety standpoint. However, as a general rule, these properties have been found to conflict with each other. Thus, a reduction in rolling resistance generally leads to an almost directionally proportional reduction in wet traction while an increase in wet traction generally leads to an almost directionally proportional increase in rolling resistance.

The prior art has proposed a number of approaches to the solution of this problem. Such approaches have generally involved modifying the properties of the elastomer or elastomer composition utilized to form the tire tread in order to achieve the best possible balance between rolling resistance and traction. The approaches involving modification of the elastomer have generally been based on improving the interaction between the elastomer and the carbon black used in compounding the elastomer to prepare the tire tread composition in order to improve the dispersion of the carbon black into the elastomer. This has the effect of reducing the hysteresis of the tire tread composition which in turn results in low rolling resistance.

One known approach to modifying the diene polymer or copolymer elastomer to reduce the hysteresis of elastomer compositions formed therefrom involves coupling the living diene polymer or copolymer chains with metal halides. Thus, U.S. Pat. Nos. 4,383,085 and 4,515,922 describe the coupling of living diene polymer or copolymer chains obtained by anionic polymerization using an organolithium initiator with metal halides such as tin halides, silicon halides and the like. These patents indicate that tire treads formed from rubber compositions containing the coupled polymers have reduced hysteresis along with reduced rolling resistance and improved wet skid resistance.

Another known approach to modifying the diene polymer or copolymer elastomer to reduce the hysteresis of elastomer composition involves terminating the living diene polymer or copolymer chains with certain compounds containing functional groups which are reactive with the lithium terminals of the living polymer as illustrated by U.S. Pat. No. 4,835,209 and EPO 0316255. Thus, U.S. Pat. No. 4,835,209 discloses the termination of living diene polymer or copolymer chains with carbodiimides. The patent discloses that rubber compositions containing such polymers have excellent performance characteristics with respect to tensile strength, impact resistance, low heat-generating properties and wear resistance without impairing wet skid properties. EPO 0316255 discloses the termination of living diene polymer or copolymer chains with a capping agent selected from the group consisting of (a) halogenated nitriles having the structural formula X—A—C≡N wherein X is a halogen atom and A is an alkylene group of 1 to 20 carbon atoms, (b) heterocyclic aromatic nitrogen-containing compounds, and (c) alkyl benzoates. This published application discloses that compositions containing such polymers have reduced hysteresis and that tire treads made from such compositions have lower rolling resistance and better traction characteristics.

Diene polymers and copolymers have also been subjected to various reactions with compounds containing reactive nitrogen-containing groups including certain substituted imines to improve certain properties of the polymers as disclosed by the following patents.

U.S. Pat. No. 3,178,398 relates to a method of preparing polymers including diene polymers and copolymers having terminal groups containing reactive nitrogen and to the curing of the resultant polymers with polyhalogen-containing compounds. The patent discloses that diene polymers or copolymers containing such terminal groups can be prepared by reacting the living diene polymer or copolymer with a non-polymerizable compound containing the structure

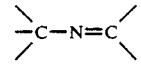

Compounds containing the foregoing structure which are disclosed in the reference include heterocyclic nitrogen compounds, substituted imines and carbodiimides. Substituted imines which are specifically disclosed include N-ethylethylidenimine, N-methylbenzylidenimine, N-hexylcinnamylidenimine, N-decyl-2-ethyl-1,2-diphenylbutylidenimine, N-phenylbenzylidenimine, N-dodecylcyclohexanimine, N-propyl-2,5-cyclohexadienimine, N-methyl-1-naphthalenimine, N,N'-dimethylbutanediimine, N,N'-dipentyl-2-pentene-1,5-diimine, N-nonyl-1,4-naphthoquinonimine, N,N'-diphenyl-1,4-quinonediimine and N,N'-diphenyl-1,3-indandiimine. The patent indicates that when such polymers are compounded and cured the resultant product has a good balance of physical properties. However, no mention is made of any effect on the hysteresis of the product.

U.S. Pat. No. 4,677,153 relates to a method for modifying a rubber having unsaturated carbon-to-carbon bonds (i.e. double bonds) with (a) an organic compound having a group represented by the formula —CH═N— and (b) an organic acid halide having a group represented by the formula —COX wherein X is a halogen atom, in the presence of a Lewis acid. Organic compounds having the group represented by the formula —CH═N— which are disclosed include substituted imines such as, for example, benzylidene methylamine, benzylidene aniline, dimethylaminobenzylidene butylaniline, etc. However, a careful reading of the reference indicates that the unsaturated rubber which is reacted with the (a) and (b) compounds is not a living polymer rubber but rather a previously terminated or "dead" polymer rubber. Thus, it appears clearly evident that the reaction between the unsaturated rubber and these compounds is not at the terminals of the polymer chains of the rubber.

The reference teaches that the modified rubber has improved green strength and when vulcanized has improved tensile and rebound resiliency.

U.S. Pat. No. 4,734,461 relates to a method of preparing diene polymers or copolymers, particularly block copolymers of the A-B-A type, which involves coupling living diene polymer or copolymer chains with new coupling agents of the general formula (Y—CH=CH—CH=N)$_n$—X and/or

wherein X=aryl, condensed aryl, aryl isolated by a heteroatom or by an alkenyl group, alkyl with a number of C atoms comprised between 2 and 20, cycloalkyl, alkylcycloalkyl, radical with heteroatom; all these groups possibly containing a functional group of vinyl aromatic, ester, aldehydic, ketonic, cyano type etc.; Y=aryl, cycloalkyl, alkyl, alkylaryl, alkylcycloalkyl, possibly containing a functional group of vinylaromatic, ester, aldehydic, ketonic, cyano type, etc; n=an integer of from 1 to 4; n'=an integer of from 1 to 4; R=H or alkyl group, preferably H; and Z=aryl, alkyl, cycloalkyl, possibly containing a functional group of vinylaromatic, ester, aldehydic, ketonic, cyano type, etc. The patent discloses that the resultant polymer has increased Mooney viscosity, molecular weight and green tensile strength as well as reduced cold flow.

U.S. Pat. No. 4,735,994 relates to a method of preparing diene polymers or copolymers, particularly block copolymers of the A-B-A type, which involves coupling living diene polymer or copolymer chains with new coupling agents of the general formula

wherein R=alkyl, condensed aryl, aryl isolated by an heteroatom or by an alkenylic group, alkyl with 2 to 20 carbon atoms, cycloalkyl, alkylcycloalkyl, radical with heteroatoms; R'=aryl, cycloalkyl, alkyl, alkylaryl, alkylcycloalkyl; n=an integer of from 2 to 4, representing the functionality of radical R'''; R''32 H or alkyl group, preferably H and R'''=aryl, alkyl or cycloalkyl. The reference discloses that the resultant polymer has increased Mooney viscosity, molecular weight and green tensile strength as well as reduced cold flow.

EPO 0207565 relates to a method of preparing diene polymers or copolymers, particularly block copolymers of the A-B-A type, which involves coupling living diene polymer or copolymer chains with new coupling agents of the general formula

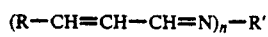

and/or

wherein R=aryl, alkyl, cycloalkyl; R'=aryl, alkyl containing 2 to 20 carbon atoms, cycloalkyl, condensed aryl, aryl isolated by an heteroatom or by an alkenylic group, radical with heteroatoms; n=an integer of from 1 to 4, representing the functionality of the R' group; R''=aryl, alkyl, cycloalkyl; n'=an integer of from 1 to 4, representing the functionality of the R'' group and R'''=H or an alkyl group, preferably H. The reference discloses that the resultant polymers have increased Mooney viscosity, molecular weight and green tensile strength as well as reduced cold flow.

Coupling processes such as those described in this reference result in increased molecular weight of the polymer which lowers hysteresis. However, such increases in the molecular weight of the polymers tend to result in poor processability of rubber compounds containing the polymers.

U.S. Pat. No. 4,816,520 relates to terminally functionalized polymers, including diene polymers and copolymers, and a process for their preparation. The reference discloses that the terminally functionalized polymers are prepared from living polymers obtained by anionic polymerization of olefinically unsaturated monomers by first reacting the living polymers with capping reagents comprising various nitrogen compounds including substituted imines (Schiff bases) and diaziridines and then reacting the capped polymer with a terminating agent which contains halogen or acid anhydride groups. Capping reagents which are disclosed include among others a compound of the formula

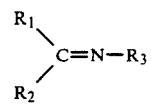

wherein R$_1$ is H, alkyl, cycloalkyl or aryl and R$_2$ and R$_3$ are each alkyl, cycloalkyl or aryl. Terminating agents which are disclosed include halogen compounds such as chloromethylstyrenes, acryloyl chloride, methacryloyl chloride, epichlorohydrin, etc. and acid anhydride compounds such as acrylic anhydride, methacrylic anhydride, maleic anhydride, etc.

SUMMARY OF THE INVENTION

In accordance with the present invention, a process for preparing a terminally functionalized polymer is provided. The process involves reacting a living polymer obtained by anionic polymerization of a diene monomer or mixture of a diene monomer and a vinylaromatic hydrocarbon monomer with a compound having the formula

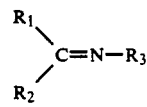

wherein R$_1$ and R$_2$ are selected from the group consisting of H, alkyl, cycloalkyl, aryl, dialkylaminoaryl, aralkyl and aprotic O, N and S- containing alkyl, cycloalkyl, aryl and aralkyl groups; wherein R$_3$ is selected from the group consisting of alkyl, cycloalkyl, aryl, dialkylaminoaryl, aralkyl and aprotic O, N, and S- containing alkyl, cycloalkyl, aryl and aralkyl groups; with the proviso that at least one of the $R_1$, $R_2$ and $R_3$ groups must be a dialkylaminoaryl group and that not all of the $R_1$, $R_2$ and $R_3$ groups can be aryl groups.

The resultant terminally functionalized polymer has reduced hysteresis properties and can be utilized to form elastomer compositions and tire treads having reduced rolling resistance and increased rebound resilience.

DETAILED DESCRIPTION OF THE INVENTION

The term "living polymer" as employed throughout the specification and claims refers to polymers which are prepared by anionic polymerization of a diene monomer or mixture of a diene monomer and a vinyl aromatic hydrocarbon monomer using an initiator such as an organolithium compound. The resultant polymer contains active terminals (e.g. lithium terminals) which can be reacted with compounds containing reactive functional groups.

The term "hysteresis" as employed throughout the specification refers to the heat generating properties of a vulcanized elastomer or rubber composition. An art recognized measurement of the hysteresis of an elastomer composition is the tan delta value of the vulcanized composition. Low tan delta values are indicative of low hysteresis and consequently tires formed from such elastomer compositions have lower rolling resistance.

As indicated heretofore, the terminally functionalized polymers of the invention are prepared by reacting a living polymer obtained by anionic polymerization of a diene monomer or a mixture of a diene monomer and a vinyl aromatic hydrocarbon monomer with certain substituted imines or Schiff bases, which are broadly defined above and more specifically defined below. Thus, the living polymers are diene polymers and copolymers. The living diene polymer is a polymer of a conjugated diene and the living diene copolymer is a random copolymer of a conjugated diene and a vinyl aromatic hydrocarbon.

Conjugated dienes which may be utilized in preparing the living polymers and copolymers include 1,3-butadiene, 2-methyl-1,3-butadiene (isoprene), 2,3-dimethyl-1,3-butadiene, 1,3-pentadiene, 1,3-hexadiene and the like as well as mixtures thereof. The preferred diene is 1,3-butadiene.

Vinyl aromatic hydrocarbons which may be utilized in preparing the living copolymers include styrene, vinyl toluene, alpha-methyl styrene, vinyl naphthalene, vinyl pyridine and the like. The preferred vinyl aromatic hydrocarbon is styrene.

The living polymer can be prepared in a well known manner by polymerizing the monomer or monomers in a hydrocarbon solvent in the presence of an anionic initiator. In instances where it is desired to control the 1,2-microstructure of the diene polymer or copolymer and to effect randomization of the copolymer, this can readily be accomplished by including an appropriate polar modifier such as an ether or a tertiary amine in the polymerization mixture.

Anionic initiators which may be utilized in the preparation of the living polymers and copolymers may be any of the organoalkali metal initiators known in the art to be useful for the polymerization of diene polymers and copolymers. The preferred initiators are organolithium initiators, especially the alkyllithium initiators. Suitable organolithium initiators which may be utilized include ethyllithium, n-butyllithium, tetramethylene dilithium, hexyllithium, cyclohexyl lithium, phenyllithium, tolyllithium and the like. A particularly preferred initiator is n-butyllithium.

It is also possible to employ as the anionic initiator an initiator formed by reacting a functionalizing agent with the above-described organolithium initiators. Thus, such initiators can be formed by reacting a functionalizing agent selected from the group consisting of substituted aldimines, ketimines and secondary amines with the organolithium compound. For example, an anionic initiator of this type can be formed by reacting a substituted aldimine such as dimethylamino benzylidene methylamine with n-butyllithium. A number of initiators of this type are described in our copending U.S. Pat. application Ser. No. 506,305, filed Apr. 9, 1990, the disclosure of which is incorporated herein by reference.

Hydrocarbon solvents which may be employed in the preparation of the living polymers and copolymers include aromatic and aliphatic hydrocarbons in which the monomers, initiator and modifier are soluble. Suitable hydrocarbon solvents include hexane, heptane, pentane, octane, cyclohexane, cycloheptane, cyclopentane, methyl cyclohexane, benzene and toluene. The preferred hydrocarbon solvents are hexane and cyclohexane.

Polar modifiers which may be utilized to control the 1,2-microstructure content of the living diene polymers or copolymers and to effect randomization of the copolymers may be any of those heretofore known in the diene polymer or copolymer art to be useful for that purpose. Suitable polar modifiers include ethers such as tetrahydrofuran (THF), tetrahydropyran, 1,4-dioxane, monoglycol methyl ether (monoglyme), diglycol methyl ether (diglyme), triglycol methyl ether (triglyme) and the oligomeric oxolanyl alkane compounds described in U.S. Pat. No. 4,429,091 such as bis (2-oxolanyl) methane; 2,2-bis (2-oxolanyl) propane; 1,1-bis (2-oxolanyl) ethane; 2,2-bis (5-methyl-2-oxolanyl) propane and the like and tertiary amine compounds such as triethyl amine, tripropyl amine, tributyl amine, N,N,N',N'-tetramethylethylene diamine (TMEDA), dipiperidino ethane, and the like. The preferred polar modifiers are TMEDA and the oligomeric oxolanyl propanes.

The living random copolymers of conjugated dienes and vinyl aromatic hydrocarbons utilized to prepare the terminally functionalized polymers of the invention may have diene contents of from about 99 to 20 percent by weight and vinyl aromatic hydrocarbon contents of from about 1 to about 80 percent by weight with the preferred copolymers having diene contents of from 90 to 60 percent by weight and vinyl aromatic hydrocarbon contents of from 10 to 40 percent by weight.

The living polymers of conjugated dienes and random copolymers of conjugated dienes and vinyl aromatic hydrocarbons employed to prepare the terminally functionalized polymer may have 1,2-microstructure contents ranging from about 10 to about 80 percent with the preferred polymers or copolymers having 1,2-microstructure contents of from 25 to 65 percent. The preparation of diene polymers or copolymers having a particular 1,2-microstructure content is dependent on a number of factors including the specific initiator, the type polar modifier, the modifier to initiator ratio and the polymerization temperature. Illustrative methods of preparing diene polymers and copolymers having 1,2-microstructure contents ranging from 15 to 90 percent or more are described in numerous patents and publications including U.S. Pat. Nos. 3,451,988 and 4,264,753; and the publication "Temperature and Concentration Effects on Polar-Modifier Alkyllithium Polymerizations and Copolymerizations", Journal of Polymer Science, Part A-1, Vol. 10, pages 1319–1334 (1972); the disclosures of which are incorporated herein by reference.

One of ordinary skill in the polymerization arts can by utilizing the disclosures of the incorporated patents and publication readily determine the type initiator, the type polar modifier, the necessary modifier-initiator ratio and polymerization conditions necessary to obtain a living diene polymer or copolymer having the desired 1,2-microstructure content.

The terminally functionalized polymers of the invention are prepared by reacting the above living polymers, preferably in solution in the hydrocarbon solvent in which they were prepared, with a substituted imine or Schiff base compound having the formula:

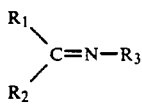

Wherein $R_1$ and $R_2$ are selected from the group consisting of H, alkyl, cycloalkyl, aryl, dialkylaminoaryl, aralkyl, and aprotic O, N, and S—containing alkyl, cycloalkyl, aryl, and aralkyl groups; wherein $R_3$ is selected from the group consisting of alkyl, cycloalkyl, aryl, dialkylaminoaryl, aralkyl, and aprotic O, N, and S—containing alkyl, cycloalkyl, aryl and aralkyl groups; with the proviso that at least one of the $R_1$, $R_2$, and $R_3$ groups must be a dialkylaminoaryl group and that not all of the and $R_1$, $R_2$, $R_3$ groups can be aryl groups. The alkyl groups in the above formula may contain from 1 to 20 carbon atoms with alkyl groups containing from 1 to 8 carbons being preferred.

It should be noted in regard to the dialkylamino aryl group that the alkyl group of the dialkylamino substituent may be either linear, branched or cyclic in nature. Thus, the dialkylamino substituent may be represented by the formula:

or by the formula:

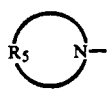

Wherein $R_4$ is an alkyl, cycloalkyl or aralkyl group containing from 1 to 12 carbon atoms and $R_5$ contains from 3 to about 6 methylene groups.

The preferred substituted imines represented by the general formula fall into two classes:

(1) Those in which $R_1$ is H and $R_2$ and $R_3$ are aryl groups with at least one of the $R_2$ and $R_3$ groups being a dialkylaminoaryl group.

(2) Those in which $R_1$ is H, $R_2$ is alkyl or aralkyl in which the carbon adjacent to the imine carbon is completely substituted with alkyl, aryl or aralkyl groups and $R_3$ is a dialkylaminoaryl group.

Illustrative examples of the $R_2$ groups of the second class include those represented by the formula:

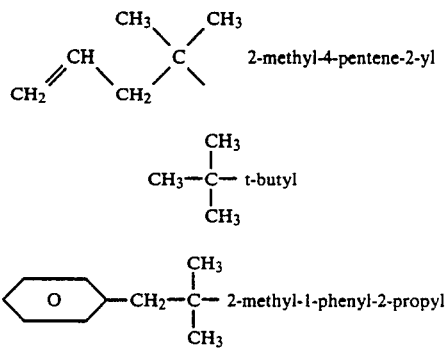

Illustrative examples of substituted imines which may be employed include dialkylaminobenzylidene alkylamines such as dimethylaminobenzylidene methylamine, dimethylaminobenzylidene ethylamine, dimethylaminobenzylidene butylamine and the like; dialkylaminobenzylidene anilines such as dimethylaminobenzylidene aniline, dimethylaminobenzylidene butylaniline, dimethylaminobenzylidene dodecylaniline and the like; dialkylaminobenzylidene alkoxyanilines such as dimethylaminobenzylidene methoxyaniline, dimethylaminobenzylidene ethoxyaniline and the like; dialkylaminobenzylidene dialkylaminoanilines such as dimethylaminobenzylidene dimethylaminoaniline, dimethylaminobenzylidene diethylaminoaniline and the like; benzylidene dialkylaminoanilines such as benzylidene dimethylaminoaniline, benzylidene diethylaminoaniline and the like and alkoxybenzylidene dialkylaminoanilines such as methoxybenzylidene dimethylaminoaniline, methoxybenzylidene diethylaminoaniline and the like and $\alpha,\alpha$-dialkylalkylidine dialkylaminoanilines.

Particularly, preferred substituted imines for use in preparing the terminally functionalized polymers of the invention are dimethylaminobenzylidene aniline, dimethylaminobenzylidene butylaniline, benzylidene dimethylaminoaniline, dimethylaminobenzylidene dimethylaminoaniline, dimethylaminobenzylidene methoxyaniline, methoxybenzylidene dimethylaminoaniline, dimethylaminobenzylidene dodecylaniline and 2-methylpent-4-en-2-yl methylidene p-dimethylaminoaniline.

The reaction of the living polymer in solution with the substituted imine terminating agent can be conducted if desired by simply adding the terminating agent per se to the polymer solution. However, it is generally preferred to add the terminating agent in the form of a solution thereof in an appropriate solvent for ease of handling. The amounts of terminating agent added to the living polymer are dependent upon the amounts of live organoalkali metal end groups (e.g. live lithium end groups) present in the living polymer and the amounts of terminating agent desired in the finished polymer. It will be noted that the number of moles of live alkali metal end groups in the living polymer is presumed to be equivalent to the number of moles of alkali metal groups present in the organoalkali metal initiator utilized to effect polymerization. In general, the amount of terminating agent employed to react with the live alkali metal groups of the living polymer herein may range from about stoichiometric, i.e. about 1 mole of terminating agent per mole of live alkali metal end groups, to a large excess of terminating agent. However, from about 1.00 to 1.25 moles of terminating agent per mole of alkali metal end groups is preferred.

Temperatures employed in reacting the living polymer with the terminating agent may vary considerably and are selected with the basic criteria of preserving the live alkali metal end groups of the living polymer for reaction with the terminating agents. Thus, the reaction temperatures may range from about 0° C. to about 100° C. with preferred temperatures ranging from 30° C. to 100° C and especially preferred temperatures ranging from 50° C. to 80° C. The reaction times may also vary considerably and are in general dependent upon reaction temperatures. Hence, the reaction times may range from about 0.5 to about 24 hours.

After the terminating reaction is complete, it is generally desirable to quench the polymer in order to deactivate any live alkali metal end groups (e.g. lithium end groups) which may remain. This serves to prevent the living polymer from reacting with any carbon dioxide or oxygen which may be present. The quenching reaction can be conducted in known manner by adding a conventional polymer terminating agent such as water or an alcohol (e.g. isopropanol) to the polymer solution.

The resultant terminally functionalized polymer may be recovered from the polymer solution and dried using conventional procedures. Thus, for example, the polymer can be recovered from solution by coagulation either by adding a sufficient volume of a non-solvent liquid (e.g. an alcohol) for the polymer to the solution or alternatively by adding the polymer solution to a sufficient volume of the non-solvent. It is usually desirable in carrying out the coagulation procedure to include an appropriate antioxidant for the polymer in the non-solvent. The recovered polymer can then be dried using a conventional polymer drying procedure such as drum drying, vacuum drying, extruder drying, tunnel drying, oven drying and the like.

Elastomer compositions of the invention can be prepared by compounding or mixing the terminally functionalized polymers herein with carbon black and other conventional rubber additives such as fillers, plasticizers, antioxidants, curing agents and the like using standard rubber mixing equipment and procedures. Such elastomer compositions when vulcanized using conventional rubber vulcanization conditions have reduced hysteresis properties and are particularly adapted for use as tread rubbers for tires having reduced rolling resistance.

The following examples are submitted for the purpose of further illustrating the nature of the present invention and should not be regarded as a limitation on the scope thereof. Parts and percentages shown in the examples are by weight unless otherwise indicated.

EXAMPLES 1-3

These examples illustrate the process for preparing the terminally functionalized polymers of the invention.

(A) Preparation of Living Random Copolymer of Butadiene/Styrene

A "living" medium vinyl butadiene/styrene copolymer was prepared in accordance with the following procedure:

To a stainless steel 50 gallon reactor equipped with stirrer and thermometer and maintained under a nitrogen atmosphere was charged 6.41 lb. (28.0 moles) of styrene, 21.6 lb (181.5 moles) of 1,3-butadiene, 158.5 lb of hexane, 49 millimoles (hereinafter abbreviated as mM) of TMEDA modifier and 99 mM of n-butyllithium initiator. After adding the initiator, the temperature of the reaction mixture was set at 38° C. and allowed to rise to 49° C. for about 15 minutes, then cooled to 24° C. with stirring, all under positive nitrogen pressure. The reaction mixture was then heated to 49° C. for an additional 4.5 hours. A sample of the resultant living copolymer was quenched with isopropanol and drum dried to serve as a control for the terminally functionalized copolymers of Examples 1-3. Additional samples of the living copolymer were terminally functionalized in accordance with the procedure of step (B).

(B) Preparation of Terminally Functionalized Copolymers

Samples of the living copolymer prepared in step (A) were then injected into 28 ounce glass bottles sealed with a rubber septum and under nitrogen purge by means of a hypodermic needle in order to avoid exposing the living copolymers to the atmosphere. The glass bottles containing samples of living copolymer were injected with various substituted imines of the invention. The amounts of living polymer solution, the amounts of living polymer, the type terminating agent and amounts thereof are shown in Table I. The control copolymer is included in Table I for convenience.

TABLE I

| Example | Live Bd/Sty Polymer soln (grams) | Live Bd/Sty Polymer (grams) | Terminator | mM Li* Theory | mM** Terminator |
|---|---|---|---|---|---|
| Control | — | — | isopropanol | — | — |
| 1 | 1230.6 | 184.6 | DMABA[1] | 1.447 | 1.445 |
| 2 | 1242.5 | 186.4 | DMABMA[2] | 1.461 | 1.460 |
| 3 | 1217.3 | 182.6 | DMABBA[3] | 1.432 | 1.432 |

*theoretical amount of live lithium ends
**approx. stoichometric amount based on amount of live lithium ends
[1] Dimethylaminobenzylidene aniline
[2] Dimethylaminobenzylidene methylamine
[3] Dimethylaminobenzylidene butylaniline The glass bottles containing the polymer solutions of examples 1-3 were then tumbled in a water bath at 50° C. for 13.5 hours to complete the terminating reaction. The terminated polymers were then quenched with 1.5 milliliters (ml) of isopropanol followed by the addition with stirring of 6 ml of a standard antioxidant solution. The polymer samples were recovered from solution by coagulating each polymer solution into two volumes (approx. 3 liters) of isopropanol. The polymers were then dried on a standard drum drier at 148° C. p The control polymer and the terminated polymers of examples 1-3 were analyzed by GPC, HNMR and DSC to determine molecular weight (Mw and Mn), molecular weight distribution (Mw/Mn), microstructure, styrene content and glass transition temperature (Tg). Polymer analyses are shown in Table II.

TABLE II

| Ex. | Molecular Weight | | | Microstructure, % | | Bound Styrene, % | Tg. °C. |
|---|---|---|---|---|---|---|---|
| | Mn | Mw | Mw/Mn | 1, 2* | 1, 4* | | |
| Control | 153, 531 | 183, 035 | 1.19 | 55.0 | 45.0 | 20.6 | −38.4 |
| 1 | 150, 297 | 181, 342 | 1.21 | 55.0 | 45.0 | 20.6 | −35.3 |
| 2 | 147, 843 | 168, 594 | 1.14 | 55.0 | 45.0 | 20.6 | −35.3 |
| 3 | 151, 107 | 173, 816 | 1.15 | 55.0 | 45.0 | 20.6 | −35.3 |

*based on butadiene = 100.

EXAMPLES 4–8

These examples illustrate the preparation of additional terminally functionalized butadiene/styrene (Bd/Sty) copolymers of the invention.

In these examples, the living copolymer was prepared in accordance with the following procedure:

To a stainless steel 5 gallon reactor equipped with stirrer and thermometer and maintained under a nitrogen atmosphere was charged 2,168.0 grams of 1,3 butadiene, 707.6 grams of styrene 8,260.0 grams of hexane, 18.87 mM of n-butyllithium and 1.785 mM of 2,2-bis (2-oxolanyl) propane modifier Polymerization of the monomers was conducted by first heating the contents of the reactor at 50° C. for 5.6 hours and then continuing heating at 32° C. for an additional 17 hours.

The terminally functionalized copolymers were prepared substantially in accordance with the procedure of step (B) of examples 1–3. For comparative purposes, samples of living copolymer were terminated with isopropanol and with certain substituted imines not within the scope of the invention to serve as controls. The terminated polymers were analyzed for properties as in examples 1–3. Details of the polymer termination reactions and polymer analysis are shown in Tables III–IV. The controls in the Tables are identified by the designations $C_1$, $C_2$, $C_3$ etc. for convenience.

TABLE III

| Ex. | $C_1$ | $C_2$ | $C_3$ | 4 |
|---|---|---|---|---|
| Live Bd/Sty Polymer soln (g) | 671.2 | 703.2 | 675.5 | 717.1 |
| Live Bd/Sty Polymer (g) | 167.8 | 175.9 | 168.9 | 176.8 |
| Terminator | i-PrOH(1) | BA(2) | BMA(3) | DMABA(4) |
| mM Li (theory) | — | 1.15 | 1.11 | 1.16 |
| mM Terminator(5) | — | 1.44 | 1.38 | 1.45 |
| Polymer analysis: | | | | |
| Molecular weight | | | | |
| Mn | 143, 857 | 147, 562 | 147, 482 | 148, 409 |
| Mw | 160, 364 | 164, 242 | 162, 628 | 165, 011 |
| Mw/Mn | 1.11 | 1.11 | 1.10 | 1.11 |
| Microstructure, % | | | | |
| 1, 2 | 43.5 | 43.5 | 43.5 | 43.5 |
| 1, 4 | 56.5 | 56.5 | 56.5 | 56.5 |
| Bound Styrene, % | 24.6 | 24.6 | 24.6 | 24.6 |
| Mooney Viscosity (ML/4/100° C.) | 38.5 | 39.8 | 38.7 | 41.0 |
| Tg, °C. | −51.7 | — | — | — |

(1)isopropanol
(2)Benzylidene aniline
(3)Benzylidene methylamine
(4)Dimethylaminobenzylidene aniline
(5)approximately 25% excess based on theoretical amount of live lithium ends TABLE III (a)*

| Ex. | 5 | 6 |
|---|---|---|
| Live Bd/Sty Polymer Soln (g) | 690.8 | 682.1 |
| Live Bd/Sty Polymer (g) | 172.7 | 170.6 |
| Terminator | BDMAA(1) | DMABDMAA(2) |
| mM Li (theory) | 1.14 | 1.12 |
| mM Terminator | 1.42 | 1.40 |
| Polymer analysis: | | |
| Molecular weight | | |
| Mn | 148, 451 | 153, 813 |
| Mw | 165, 640 | 170, 963 |
| Mw/Mn | 1.12 | 1.11 |
| Microstructure, % | | |
| 1, 2 | 43.5 | 43.5 |
| 1, 4 | 56.5 | 56.5 |
| Bound Styrene, % | 24.6 | 24.6 |
| Mooney Viscosity (ML/4/100%) | 42.0 | 42.0 |
| Tg, °C. | — | — |

*Continuation of Table III
(1)Benzylidene dimethylaminoaniline
(2)Dimethylaminobenzylidene dimethylaminoaniline

TABLE IV

| Ex. | $C_4$ | 7 | 8 |
|---|---|---|---|
| Live Bd/Sty Polymer soln (g) | — | 760.5 | 771.1 |
| Live Bd/Sty Polymer (g) | — | 168.0 | 170.4 |
| Terminator | i-PrOH | DMABMOA(1) | MOBDMAA(2) |
| mM Li (theory) | — | 1.159 | 1.176 |
| mM Terminator(3) | — | 1.391 | 1.411 |
| Polymer analysis: | | | |
| Molecular weight | | | |
| Mn | 160, 397 | 155, 278 | 156, 490 |
| Mw | 180, 356 | 175, 448 | 176, 713 |
| Mw/Mn | 1.12 | 1.13 | 1.13 |
| Microstructure, % | | | |
| 1, 2 | 62.7 | 62.7 | 62.7 |
| 1, 4 | 37.3 | 37.3 | 37.3 |
| Bound Styrene, % | 25.0 | 25.0 | 25.0 |
| Mooney Viscosity (ML/4/100° C.) | 53.0 | 54.3 | 53.0 |
| Tg, °C. | −30 | — | — |

(1)Dimethylaminobenzylidene methoxyaniline
(2)Methoxybenzylidene dimethylaminoaniline
(3)approx 20% excess based on theoretical amount of live Li ends

EXAMPLE 9

This example illustrates the preparation of a terminally functionalized butadiene/styrene copolymer of the invention on a larger scale.

In this example, a living copolymer was prepared in a stainless steel 50 gallon reactor substantially in accordance with the procedure of step (A) of examples 1–3 except that the oligomeric oxolanyl propane compound of examples 4–8 was utilized as the polar modifier. A small sample of the resultant living copolymer was then terminated with isopropanol to serve as a control. The remainder of the living copolymer batch was then terminally functionalized substantially in accordance with the procedure described in examples 1–8. The terminated polymers were analyzed for properties as in examples 1–8. Details of the polymer termination reaction and polymer analysis are shown in Table V.

TABLE V

| Ex. | $C_5$ | 9 |
|---|---|---|
| Live Bd/Sty Polymer Soln (g) | — | 68,456.0 |
| Live Bd/Sty Polymer (g) | — | 10,268.4 |
| Terminator | i-PrOH | DMABDDA[1] |
| mM Li (theory) | — | 99.13 |
| mM Terminator[2] | — | 114 |
| Polymer analysis: | | |
| Molecular weight | | |
| Mn | 129, 368 | 132, 664 |
| Mw | 158, 303 | 153, 279 |
| Mw/Mn | 1.22 | 1.16 |
| Microstructure, % | | |
| 1, 2 | 60.2 | 60.2 |
| 1, 4 | 39.8 | 39.8 |
| Bound Styrene, % | 22.1 | 22.1 |
| Mooney Viscosity (ML/4/100° C.) | 33.0 | 27.0 |
| Tg, °C. | −35.8 | — |

[1]Dimethylaminobenzylidene dodecylaniline
[2]15% excess based on amount of live Li ends

EXAMPLES 10–18

These examples illustrate the effect of the terminally functionalized butadiene/styrene copolymers of the invention on the hysteresis and stress-strain properties of cured elastomer or rubber compounds containing them.

In these examples, the terminally functionalized copolymers of examples 1–9 were compounded with carbon black and other conventional rubber additives using a standard tread rubber compound formulation. These compound examples are identified in the Tables below as Compound examples 10–18. The associated control copolymers (Control and $C_1$–$C_5$) were compounded in the same manner to serve as control compounds. The control compounds are identified in the Tables below as Compound examples A–F.

The standard tread rubber compound had the following formulation:

| | parts by weight |
|---|---|
| copolymer | 100.0 |
| carbon black | 55.0 |
| process oil | 10.0 |
| zinc oxide | 3.0 |
| stearic acid | 2.0 |
| antioxidant | 1.0 |
| wax | 2.0 |
| sulphur | 1.5 |
| accelerator | 1.0 |

The rubber compounds were mixed using conventional rubber mixing equipment and procedures. The resultant tread rubber compounds were then cured for 35 minutes at 148° C. The cured compounds were tested for hysteresis (Tan delta) and stress-strain properties. Tan delta (Tan δ) was conducted at 22° C. and 50° C. using a Dynastate machine operating at a frequency of 1 Herz and 7% strain. Tan δ is a measure of the ratio of the loss modulus of the compound to the storage modulus and as indicated above, the lower the value of Tan δ, the lower the hysteresis of the compound. Tests and test results are shown in Tables VI–IX.

TABLE VI

| Compound Ex. | A | 10 | 11 | 12 |
|---|---|---|---|---|
| Copolymer Ex. | Control | 1 | 2 | 3 |
| Copolymer Terminator | i-PrOH | DMABA | DMABMA | DMABBA |

TABLE VI-continued

| Compound Ex. | A | 10 | 11 | 12 |
|---|---|---|---|---|
| Tan δ | | | | |
| 22° C. | .2058 | 1281 | .1700 | .1222 |
| 50° C. | .1505 | .0896 | .1330 | .0831 |
| % Δ Tan δ* | | | | |
| 22° C. | — | −37.8 | −17.4 | −40.6 |
| 50° C. | — | −40.5 | −11.6 | −44.8 |
| Stress-Strain, R.T. | | | | |
| 300% modulus, psi | 1741 | 2022 | 2328 | 2392 |
| Tensile, psi | 2235 | 3034 | 3116 | 2922 |
| Elongation at Break, % | 420 | 463 | 434 | 400 |

*% change in Tan δ: minus values indicate reduction in Tan δ.

Compound examples 10–12 contain copolymers which are terminally functionalized with substituted imines of the invention. As indicated by the above Tan δ values, these compounds exhibit reduced hysteresis as compared to compound example A which contains the unmodified control copolymer. Thus, compound examples 10–12 show Tan δ reductions of about 12–45% at 50° C. and about 17–40% at 22° C. as compared to the Tan δ values of control compound example A at these temperatures. Since all of the polymers used in these compounds were derived from the same base polymer, the structural variations were minimized and molecular weights were closely matched as shown in Table II thereby eliminating the effect of these factors on compound hysteresis. As further indicated by the Tan δ results, the copolymers terminated with dimethylaminobenzylidene aniline (DMABA) and dimethylaminobenzylidene butylaniline (DMABBA), preferred terminating agents of the invention, were somewhat more effective in reducing compound hysteresis than the copolymer terminated with dimethylaminobenzylidene methylamine (DMABMA).

TABLE VII

| Compound Ex. | B | C | D | 13 |
|---|---|---|---|---|
| Copolymer Ex. | $C_1$ | $C_2$ | $C_3$ | 4 |
| Copolymer Terminator | i-PrOH | BA | BMA | DMABA |
| Tan δ | | | | |
| 22° C. | .1826 | .1761 | .1513 | .1175 |
| 50° C. | .1423 | .1366 | .1195 | .0827 |
| % Δ Tan δ | | | | |
| 22° C. | — | −3.6 | −17.1 | −35.7 |
| 50° C. | — | −4.7 | −16 | −41.9 |
| Stress-Strain, R.T. | | | | |
| 300% modulus psi | 1974 | 2066 | 2058 | 2197 |
| Tensile, psi | 2560 | 3007 | 2782 | 2945 |
| Elongation at break, % | 375 | 415 | 387 | 373 |

TABLE VII (a)*

| Compound Ex. | B** | 14 | 15 |
|---|---|---|---|
| Copolymer Ex. | $C_1$ | 5 | 6 |
| Copolymer Terminator | i-PrOH | BDMAA | DMABDMAA |
| Tan δ | | | |
| 22° C. | .1826 | .1118 | .1224 |
| 50° C. | .1423 | .0782 | .0865 |
| % Δ Tan δ | | | |
| 22° C. | — | −38.8 | −33.0 |
| 50° C. | — | −45.0 | −39.2 |
| Stress-Strain, R.T. | | | |
| 300% modulus, psi | 1974 | 2104 | 2295 |
| Tensile, psi | 2560 | 3232 | 3202 |
| Elongation at Break, % | 375 | 414 | 391 |

*Continuation of Table VII
**repeated from Table VII for convenience in comparing data As in the compound examples of Table VI, all of the copolymers used in the compounds of Tables VII and VII(a) were derived from the same base copolymer (see Tables III and III(a)) in order to minimize structural and molecular weight variations, thereby eliminating or substantially reducing the effect of these factors on compound hysteresis. As clearly indicated by the above data, compound examples 13-15 which contain copolymers terminated with substituted imines of the invention exhibit reduced hysteresis as compared to compound example B which contains the unmodified copolymer example $C_1$. Thus, compound examples 13-15 show Tan δ reductions ranging from about 36-45% at 22° C. and from about 33-42% at 50° C. as compared to the Tan 67 values of compound example B. In contrast, compound examples C and D which contain copolymers terminated with benzylidene aniline (BA) and benzylidene methylamine (BMA) respectively (copolymer examples $C_2$ and $C_3$), substituted imines which do not contain a dialkylaminoaryl substituent and are therefore outside the scope of the invention, exhibit either very little reduction in hysteresis (compound example C) or much less of a reduction in hysteresis (compound example D) as compared to compound examples 13-15 which contain copolymers terminated with substituted imines of the invention. This clearly indicates that not all substituted imines which could be utilized to terminate living copolymers are effective in reducing compound hysteresis but rather that only a limited number of substituted imines are effective for that purpose.

TABLE VIII

| Compound Ex. | E | 16 | 17 |
|---|---|---|---|
| Copolymer Ex. | $C_4$ | 7 | 8 |
| Copolymer Terminator | i-PrOH | DMABMOA | MOBDMAA |
| Tan δ | | | |
| 22° C. | 0.2164 | 0.1453 | 0.1493 |
| 50° C. | 0.1655 | 0.1019 | 0.0967 |
| % Δ Tan δ | | | |
| 22° C. | — | −32.9 | −31 |
| 50° C. | — | −38.4 | −41.6 |
| Stress-Strain. R.T. | | | |
| 300% modulus, psi | 1955 | 2199 | 2388 |
| Tensile, psi | 1991 | 2559 | 2729 |
| Elongation at break, % | 304 | 337 | 332 |

TABLE IX

| Compound Ex. | F | 18 |
|---|---|---|
| Copolymer Ex. | $C_5$ | 9 |
| Copolymer Terminator | i-PrOH | DMABDDA |
| Tan δ | | |
| 22° C. | 0.1939 | 0.1326 |
| 50° C. | 0.1490 | 0.1061 |
| % Δ Tan δ | | |
| 22° C. | — | −31.6 |
| 50° C. | — | −28.8 |
| Stress-Strain, R.T. | | |
| 300% modulus, psi | 2119 | 2075 |
| Tensile, psi | 2779 | 3083 |
| Elongation at break, % | 432 | 465 |

As in compound examples 10-15, compound examples 16-18 of Table VIII and IX which contain copolymers terminated with substituted imines of the invention (copolymer examples 7-9) exhibit reduced hysteresis as compared to compound examples E and F which contain unmodified control copolymers (copolymer examples $C_1$ and $C_5$). Thus, compound examples 16-18 show hysteresis reductions ranging from about 31-33% at 22° C. and from about 29-42% at 50° C. as compared to the hysteresis values of control compound examples E and F.

We claim:

1. A process for preparing a terminally functionalized polymer from a living polymer suitable for use in compositions for the tread portion of tires obtained by anionic polymerization of a diene monomer or mixture of a diene monomer and a vinyl aromatic hydrocarbon monomer which comprises reacting the living polymer with a compound having the formula:

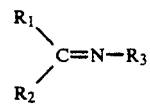

Wherein $R_1$ and $R_2$ are selected from the group consisting of H, alkyl, cycloalkyl, aryl, dialkylaminoaryl, aralkyl, and aprotic O, N and S-containing alkyl, cycloalkyl, aryl, and aralkyl groups; wherein $R_3$ is selected from the group consisting of alkyl, cycloalkyl, aryl, dialkylaminoaryl, aralkyl, and aprotic O, N and S- containing alkyl, cycloalkyl, aryl and aralkyl groups;

With the proviso that at least one of the $R_1$, $R_2$, and $R_3$ groups must be a dialkylaminoaryl group and that not all of the $R_1$, $R_2$, and $R_3$ groups can be aryl groups.

2. The process of claim 1 wherein said living polymer is a living polymer of butadiene or a copolymer of butadiene and styrene.

3. The process of claim 1 wherein said compound is selected from the group consisting of dialkylaminobenzylidene alkylamines, dialkylaminobenzylidene anilines, dialkylaminobenzylidene alkoxyanilines, dialkylamino benzylidene dialkylaminoanilines, benzylidene dialkylaminoanilines, alkoxybenzylidene dialkylaminoanilines and α,α-dialkylalkylidene dialkylaminoanilines.

4. The process of claim 1 wherein said compound is dimethylaminobenzylidene aniline.

5. The process of claim 1 wherein said compound is benzylidene dimethylaminoaniline.

6. The process of claim 1 wherein said compound is dimethylaminobenzylidene dimethylaminoaniline.

7. The process of claim 1 wherein said compound is dimethylaminobenzylidene methoxyaniline.

8. The process of claim 1 wherein said compound is dimethylaminobenzylidene dodecylaniline or dimethylaminobenzylidene butylaniline.

9. The process of claim 1 wherein said compound is methoxybenzylidene dimethylaminoaniline.

10. The process of claim 1 wherein said terminally functionalized polymer is a terminally functionalized polymer of butadiene or a copolymer of butadiene and styrene.

11. A terminally functionalized polymer prepared by reacting a living polymer obtained by anionic polymerization of a diene monomer or a mixture of a diene monomer and a vinyl aromatic hydrocarbon monomer with a compound having the formula:

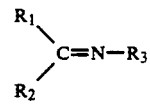

Wherein $R_1$ and $R_2$ are selected from the group consisting of H, alkyl, cycloalkyl, aryl, dialkylaminoaryl, aralkyl, and aprotic O, N, and S-containing alkyl, cycloalkyl, aryl, and aralkyl groups; wherein $R_3$ is selected from the group consisting of alkyl, cycloalkyl, aryl, dialkylaminoaryl, aralkyl, and aprotic O, N and S- containing alkyl, cycloalkyl, aryl and aralkyl groups;

With the proviso that at least one of the $R_1$, $R_2$, and $R_3$ groups must be a dialkylaminoaryl group and that not all of the $R_1$, $R_2$ and $R_3$ groups can be aryl groups.

12. The terminally functionalized polymer of claim 11 wherein said terminally functionalized polymer is a polymer of butadiene or a copolymer of butadiene and styrene.

13. The terminally functionalized polymer of claim 11 wherein the terminal functional group is formed by reacting the living polymer with a compound selected from the group consisting of dialkylaminobenzylidene alkylamines, dialkylaminobenzylidene anilines, dialkylaminobenzylidene alkoxyanilines, dialkylaminobenzylidene dialkylaminoanilines, benzylidene dialkylaminoanilines, alkoxybenzylidene dialkylaminoanilines and $\alpha,\alpha$-dialkylalkylidene dialkylaminoanilines.

14. The terminally functionalized polymer of claim 11 wherein the terminal functional group of the polymer is formed by reacting the living polymer with dimethylaminobenzylidene aniline.

15. The terminally functionalized polymer of claim 11 wherein the terminal functional group is formed by reacting the living polymer with benzylidene dimethylaminoaniline.

16. The terminally functionalized polymer of claim 11 wherein the terminal functional group is formed by reacting the living polymer with dimethylaminobenzylidene dimethylaminoaniline.

17. The terminally functionalized polymer of claim 11 wherein the terminal functional group is formed by reacting the living polymer with dimethylaminobenzylidene methoxyaniline.

18. The terminally functionalized polymer of claim 11 wherein the terminal functional group is formed by reacting the living polymer with dimethylaminobenzylidene dodecylaniline or dimethylaminobenzylidene butylaniline.

19. The terminally functionalized polymer of claim 11 wherein the terminal functional group is formed by reacting the living polymer with methoxybenzylidene dimethylaminoaniline.

20. An elastomer composition adapted for use in forming the tread portion of tires having reduced rolling resistance which comprises a terminally functionalized elastomeric polymer and rubber additives, wherein said terminally functionalized polymer is prepared by reacting a living polymer obtained by anionic polymerization of a diene monomer or mixture of a diene monomer and a vinyl aromatic hydrocarbon monomer with a compound having the formula:

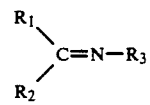

Wherein $R_1$ and $R_2$ are selected from the group consisting of H, alkyl, cycloalkyl, aryl, dialkylaminoaryl, aralkyl, and aprotic O, N, and S-containing alkyl, cycloalkyl, aryl, and aralkyl groups; wherein $R_3$ is selected from the group consisting of alkyl, cycloalkyl, aryl, dialkylaminoaryl, aralkyl, and aprotic O, N, and S - containing alkyl, cycloalkyl, aryl, and aralkyl groups;

With the proviso that at least one of the $R_1$, $R_2$, and $R_3$ groups must be a dialkylaminoaryl group and that not all of the $R_1$, $R_2$ and $R_3$ groups can be aryl groups.

21. The elastomer composition of claim 20 wherein said terminally functionalized polymer is a polymer of butadiene or a copolymer of butadiene and styrene.

22. The elastomer composition of claim 20 wherein the terminal functional group of said terminally functionalized polymer is formed by reacting the living polymer with a compound selected from the group consisting of dialkylaminobenzylidene alkylamines, dialkylaminobenzylidene anilines, dialkylaminobenzylidene alkoxyanilines, dialkylaminobenzylidene dialkylaminoanilines, benzylidene dialkylaminoanilines, alkoxybenzylidene dialkylaminoanilines and $\alpha,\alpha$-dialkylalkylidene dialkylaminoanilines.

23. The elastomer composition of claim 20 wherein the terminal functional group of said terminally functionalized polymer is formed by reacting the living polymer with dimethylaminobenzylidene aniline.

24. The elastomer composition of claim 20 wherein the terminal functional group of said terminally functionalized polymer is formed by reacting the living polymer with benzylidene dimethylaminoaniline.

25. The elastomer composition of claim 20 wherein the terminal functional group of said terminally functionalized polymer is formed by reacting the living polymer with dimethylaminobenzylidene dimethylamino aniline.

26. The elastomer composition of claim 20 wherein the terminal functional group of said terminally functionalized polymer is formed by reacting the living polymer with dimethylaminobenzylidene methoxyaniline.

27. The elastomer composition of claim 20 wherein the terminal functional group of said terminally functionalized polymer is formed by reacting the living polymer with dimethylaminobenzylidene dodecylaniline or dimethylaminobenzylidene butylaniline.

28. The elastomer composition of claim 20 wherein the terminal functional group of said terminally functionalized polymer is formed by reacting the living polymer with methoxybenzylidene dimethylaminoaniline.

* * * * *

UNITED STATES PATENT AND TRADEMARK OFFICE
CERTIFICATE OF CORRECTION

PATENT NO. : 5,066,729

DATED : November 19, 1991

INVENTOR(S) : Mark L. Stayer, Jr., et al.

It is certified that error appears in the above-identified patent and that said Letters Patent is hereby corrected as shown below:

Column 16, line 58, claim 11, insert "suitable for use in compositions for the tread portion of tires" after the words "living polymer".

Signed and Sealed this

Twentieth Day of April, 1993

Attest:

MICHAEL K. KIRK

*Attesting Officer*     *Acting Commissioner of Patents and Trademarks*